H. M. LEWIS.
CONE CLUTCH.
APPLICATION FILED DEC. 5, 1916.

1,240,741.

Patented Sept. 18, 1917.

Witnesses.

Inventor
H. M. Lewis.
By
Attorney

UNITED STATES PATENT OFFICE.

HOMER M. LEWIS, OF SPRINGFIELD, ILLINOIS, ASSIGNOR OF ONE-HALF TO ALBA G. SWAYZEE, OF SPRINGFIELD, ILLINOIS.

CONE-CLUTCH.

1,240,741.  Specification of Letters Patent.  Patented Sept. 18, 1917.

Application filed December 5, 1916. Serial No. 135,170.

*To all whom it may concern:*

Be it known that I, HOMER M. LEWIS, a citizen of the United States, residing at Springfield, in the county of Sangamon, State of Illinois, have invented certain new and useful Improvements in Cone-Clutches; and I do hereby declare the following to be a full, clear, and exact description of the invention, such as will enable others skilled in the art to which it appertains to make and use the same.

This invention relates to friction clutches, and has particular reference to a double-faced friction cone clutch.

The primary object of the invention is to construct a cone clutch of improved form in which double-cone elements are peculiarly formed in order to provide a clutch of simple form and effective operation. These purposes are attained partly by the provision of a new type of supporting frame and cones.

A further object of the invention is to provide a cone clutch which will not "grab" when the clutch faces are brought together, yet will take hold firmly and smoothly without undue frictional loss. This purpose is carried out by the provision of a resilient backing for the clutch facings, this resilience providing just sufficient flexibility to the support for the cone facings to cause them to take a gradual hold upon the opposing clutch members.

With the above objects in view and such others as may hereinafter appear, my invention will now be fully set forth and described, reference being had to the accompanying drawings.

In the drawings:—

Figure 1:
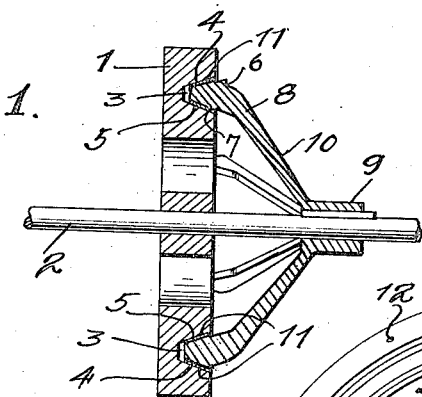
Figure 1 is a longitudinal section through the clutch.
Figure 2:
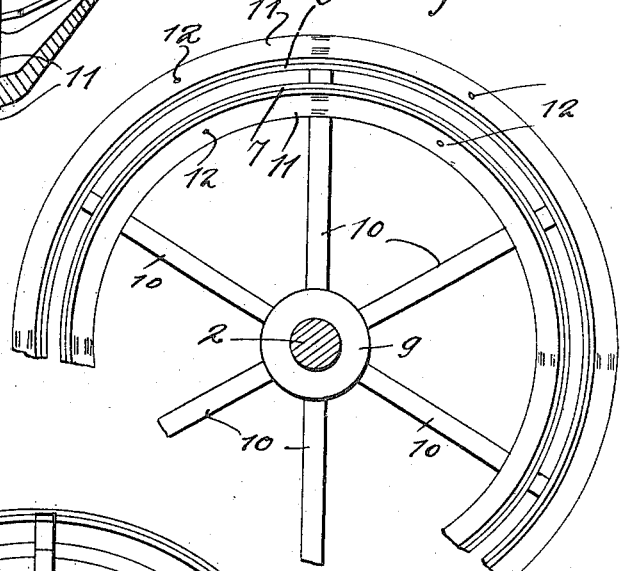
Fig. 2 is a plan view of the cone element.
Figure 3:
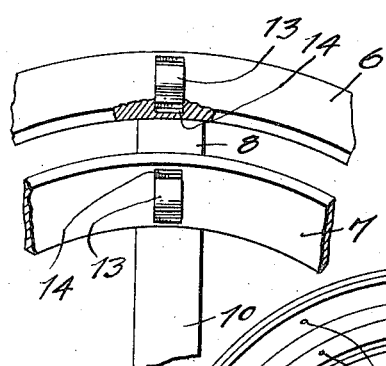
Fig. 3 is a plan view of the cone element with the facings removed.
Figure 4:
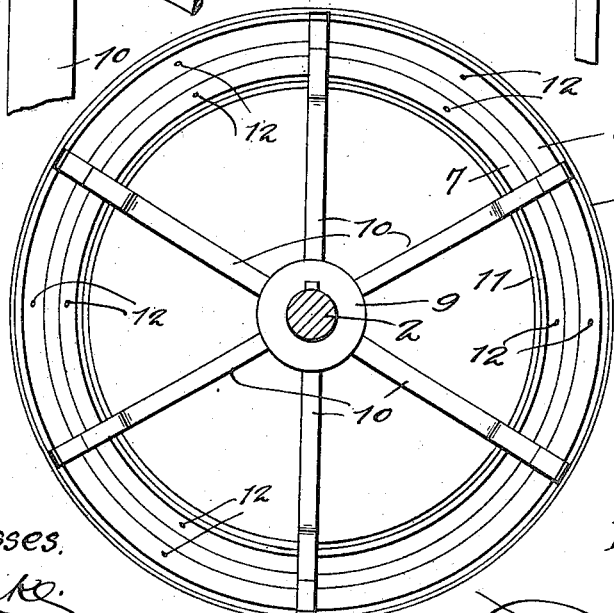
Fig. 4 is a rear view of the clutch frame.

Referring more particularly to the drawings, 1 indicates a fly wheel, pulley or other rotary element mounted upon a shaft 2 and having the annular recess 3 which provides the opposing inclined clutch facings 4 and 5. Coöperating with the facings 4 and 5 are the cones 6 and 7 respectively, which are supported by the V-shaped arms or frame members 8. The frame members 8 radiate from a hub 9 which may be of any usual or suitable construction, to be operated longitudinally of the shaft 2, upon which it is slidably keyed. The frame members 8 are extensions of the radially extending arms 10 which rise from the hub in inclined relation. The frame members 8 when formed as radiating parts of the hub provide with the intermediate parts of the casting the cones or annular clutch elements 6 and 7. The cone or clutch element 6 is formed upon the outer faces of the frame members 8 and is adapted to be moved into contact with the facing 4. The element 7 is formed upon the inner faces of the members 8, and is adapted to be brought into contact with the facing 5. Clutch facings 11 of leather or other suitable material are secured upon the outsides of the cones 6 and 7, as by rivets 12 passed through the latter and the facings at stated intervals. Between the groups of rivets 12 and in the faces of the cones 6 and 7 are seated the elongated spring members 13. The latter are preferably flat spring metal devices having their middle portions raised and their ends seated in the transverse recesses 14, so as to normally raise the intermediate portion of the facings 11 upwardly. Preferably the springs are four in number, so that four elevated portions of the facings are provided for each cone whereby, when the cones are brought into contact with the faces 4 and 5, the whole surfaces of the facings will not be brought into immediate contact with the surfaces 4 and 5, but the contact will be first at the four points, and then as the springs are compressed by continued longitudinal movement of the hub 9, the entire surface of the facings will be brought into contact with the facings 4 and 5, but not until the elements have been initially checked.

From the foregoing, it is evident that I have provided a very simple and practical cone clutch. The manner of mounting the cones 6 and 7 upon the peculiarly formed radiating arms of the frame provide a very simple, practical and strong clutch, and furthermore, the construction whereby the cone facings are brought into gradual contact with the opposing clutch faces provides a mechanism which prevents the "grabbing" of the clutch elements, so as to injure the parts of the mechanism, and this construction also prevents the undue wearing of the facings.

What I claim as my invention is:—

1. A cone clutch comprising in combination, a recessed clutch member, a movable member consisting of a hub, a plurality of radiating arms extending forwardly from the hub toward the recessed member, oppositely faced annular clutch members formed on the arms, facings upon the last-named clutch members and spring elements disposed between the facings and the clutch elements to resiliently support the facings.

2. A cone clutch comprising in combination, a recessed clutch member, a movable member consisting of a hub, a plurality of radiating arms extending forwardly from the hub toward the recessed member, oppositely faced annular clutch members formed on the arms, facings upon the clutch members and means interposed at intervals between the facings and the clutch elements to raise the facings at points of initial contact with the recessed member.

In testimony whereof, I affix my signature, in the presence of two witnesses.

HOMER M. LEWIS.

Witnesses:
 ALVA G. SWAYZE,
 RALPH H. GUSSWEIN.

Copies of this patent may be obtained for five cents each, by addressing the "Commissioner of Patents, Washington, D. C."